United States Patent
Seki et al.

(10) Patent No.: US 8,690,449 B2
(45) Date of Patent: Apr. 8, 2014

(54) WHEEL BEARING APPARATUS

(71) Applicants: Makoto Seki, Iwata (JP); Tomoko Baba, Iwata (JP)

(72) Inventors: Makoto Seki, Iwata (JP); Tomoko Baba, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/826,666

(22) Filed: Mar. 14, 2013

(65) Prior Publication Data

US 2013/0195389 A1    Aug. 1, 2013

Related U.S. Application Data

(63) Continuation of application No. PCT/JP2011/071496, filed on Sep. 21, 2011.

(30) Foreign Application Priority Data

Sep. 22, 2010   (JP) .................................. 2010-212114

(51) Int. Cl.
  *F16C 33/78*   (2006.01)
(52) U.S. Cl.
  USPC ........................................ 384/544; 384/489
(58) Field of Classification Search
  USPC ......................................... 384/544, 589, 489
  See application file for complete search history.

(56) References Cited

U.S. PATENT DOCUMENTS

| | | | |
|---|---|---|---|
| 8,393,795 B2 * | 3/2013 | Aritake et al. | 384/489 |
| 8,534,922 B2 * | 9/2013 | Takada | 384/489 |

FOREIGN PATENT DOCUMENTS

| | | |
|---|---|---|
| JP | 04-244631 | 9/1992 |
| JP | 2000-249138 | 9/2000 |
| JP | 2008-105626 | 5/2008 |
| JP | 2008-164083 | 7/2008 |
| JP | 2010-106909 | 5/2010 |
| JP | 2010-151277 | 7/2010 |
| JP | 2010-190421 | 9/2010 |
| JP | 2012-167821 | 9/2012 |
| JP | 2012-255455 | 12/2012 |

* cited by examiner

*Primary Examiner* — Thomas R Hannon
(74) *Attorney, Agent, or Firm* — Harness, Dickey & Pierce, P.L.C.

(57) ABSTRACT

A wheel bearing apparatus has a protecting cover formed from non-magnetic material with a substantially dish-shaped configuration. A cylindrical fitting portion is adapted to be press-fit onto the inner circumference of the inner-side end of the outer member. A disc-shaped shielding portion extends radially inward from the fitting portion, via a radially tapered portion. A bottom portion extends from the shielding portion, via a stepped portion. A flat relief portion is formed between the radially tapered portion and the shielding portion. The relief portion is parallel with the shielding portion. The relief portion is set slightly back from the shielding portion toward the radially tapered portion. An elastic member is integrally adhered to the outer circumference of the radially tapered portion. The elastic member elastically contacts with the inner circumference of the inner-side end of the outer member.

10 Claims, 6 Drawing Sheets

$t1 \geqq 0.4mm$ $t1/t0 \geqq 0.8$ (a)

(b)

(c)

(d)

US 8,690,449 B2

WHEEL BEARING APPARATUS

CROSS-REFERENCE TO RELATED APPLICATIONS

This application is a continuation of International Application No. PCT/JP2011/071496, filed Sep. 21, 2011, which claims priority to Japanese Application No. 2010-212114, filed Sep. 22, 2010. The disclosures of the above applications are incorporating herein by reference.

FIELD

The present disclosure relates to a wheel bearing apparatus that rotationally supports a wheel of a vehicle and, more particularly, to a wheel bearing apparatus with a protecting cover sealing the inside of the wheel bearing apparatus.

BACKGROUND

It is generally known that a wheel bearing apparatus with a wheel speed detecting apparatus rotationally supports a wheel of a vehicle relative to a suspension apparatus and detects the wheel speed to control an anti-lock braking system (ABS). Such a bearing apparatus generally includes a sealing apparatus arranged between inner and outer members that are rotated relative to each other via rolling elements. A magnetic encoder, with magnetic poles alternately arranged along its circumference, is integrated with the sealing apparatus. A wheel speed detecting sensor is arranged opposite to the magnetic encoder to detect the variation of magnetic poles of the magnetic encoder due to the rotation of wheel. The speed detecting sensor can be mounted on a knuckle that forms part of a suspension apparatus of a vehicle, after the wheel bearing apparatus has been mounted on the knuckle.

An example of a wheel bearing apparatus is shown in FIG. 6. The wheel bearing apparatus includes an outer member 50, an inner member 51, and a plurality of balls 52 contained between the outer 50 and inner 52 members. The inner member 51 has a wheel hub 53 and an inner ring 54 press-fit onto the wheel hub 53.

The outer member 50 outer circumference has an integrally formed body mounting flange 50b that is secured to the knuckle 65 which forms a suspension apparatus. Double row outer raceway surfaces 50a, 50a are integrally formed on the outer member inner circumference. In addition, a sensor 63 is secured on the knuckle 65 by a screw 66.

The wheel hub 53 has a wheel mounting flange 55 on its one end. A wheel (not shown) is mounted to the wheel mounting flange 55. The wheel hub outer circumference has an inner raceway surface 53a. A cylindrical portion 53b axially extends from the inner raceway surface 53a. The inner ring 54 is axially secured on the cylindrical portion 53b by a caulked portion 53c. The caulked portion is formed by plastically deforming the end of the cylindrical portion 53b. The inner ring outer circumference includes an inner raceway surface 54a.

A seal ring 56 is inserted into the outer side end of the outer member 50. The seal ring lip slidably contacts the base 55a of the wheel mounting flange 55. An encoder 57 is fit onto the inner-side outer circumference of the inner ring 54. The encoder 57 has an annular supporting ring 58 with a substantially "L" shaped cross-section. An annular encoder body 59 is adhered to a whole side surface of the supporting ring 58. The encoder body 59 is constructed as a rotary encoder to detect the wheel speed. The encoder body 59 has N and S poles alternately arranged along its circumstances.

The inner-side opening of the outer member 50 is closed by a protecting cover 60. This cover 60 is formed from non-magnetic plate materials such as a non-magnetic stainless steel plate, aluminum alloy plate or high functional resin etc. It has a simple "flat-U" configuration. It includes a disc-shaped closing plate portion 61 and a cylindrical fitting portion 62 around the closing plate portion 61.

As shown in FIG. 7(a), the side surface of the encoder body 59, forming the encoder 57, closely opposes the protecting cover 60. A detecting portion 64 of the sensor 64 is arranged close to or in contact with the side surface of the cover 60, via the cover 60. The presence of the cover 60 prevents entry of water, iron dust, magnetized debris etc. into the space between the sensor 63 and the encoder 57. Thus, this prevents breakage of the sensor 63 and the encoder 57 as well as prevents disturbance or degradation of regular and cyclic variation of the magnetic characteristics of the encoder body 59. See Japanese Laid-open Patent Publication No. 249138/2000.

However, there are the following problems in the wheel bearing apparatus of the prior art. Since the protecting cover 60 is mounted on the outer member 50 only by a metal-to-metal fitting, sufficient sealing in the fit portion cannot be attained without providing a high accuracy of surface finish and roughness on the fitting surfaces. In addition, the cover 60 is formed with a cross-sectional configuration of a simple "C" shape. Thus, the rigidity of the protecting cover 60 is insufficient. Further, it is believed that the cover 60 would be deformed by bouncing pebbles and thus it will contact with the encoder body 59.

In order to obtain sealability for the fitting portion of the protecting cover 67, as shown in FIG. 7(b), a synthetic rubber sealing member 68 is provided on the outer circumference of a radially tapered portion 67a. The tapered portion is formed between a cylindrical fitting portion 62 and the closing plate portion 61. The sealing member 68 elastically contacts against the outer member 50. However, this is not preferable since the die-pressing at the radially tapered portion 67a, during the vulcanizing process of the sealing member 68, requires high skill and technology with respect to the accuracy of the aligning portion. The die-pressing would cause distortion in the cover 67.

In addition, the sealing member 68 is vulcanizingly adhered so that it extends to the side surface of the closing plate portion 61 as shown in FIG. 7(c). Although the generation of the distortion of the cover 67 can be prevented, the rubber of the sealing member 68 will bulge out from the bent portion to the side surface of the closing plate portion 61. Thus, it is believed that the sealing member 68 would interfere with the detecting portion 64 of the sensor 63.

Furthermore, the sealing member 68 is vulcanizingly adhered so that it further projects toward the side surface of the closing plate portion 61 as shown in FIG. 7(d). Although generation of the distortion of the cover 67 and bulging-out of the sealing member 68 from the bent portion toward the side surface of the closing plate portion 61 can be prevented, it should be necessary to arrange the sensor 63 so as to avoid interference between the projected portion of the sealing rubber and the detecting portion 64 of the sensor 63. Thus, detecting accuracy would be detracted due to an increase in the air gap between the encoder 57 and the detecting portion 64.

SUMMARY

Accordingly, it is an object of the present disclosure to provide a wheel bearing apparatus that can protect the magnetic encoder while improving the sealability of the fitted portion between the protecting cover and the outer member. Thus, it improves the detecting accuracy and reliability of the rotational speed of a wheel.

A wheel bearing apparatus comprises an outer member integrally formed with double row outer raceway surfaces on its inner circumference. An inner member includes a wheel hub and at least one inner ring. The wheel hub is integrally formed on its one end with a wheel mounting flange. A cylindrical portion axially extends from the wheel mounting flange. The inner ring is press-fit onto the cylindrical portion of the wheel hub. The wheel hub and the inner ring are formed with double row inner raceway surfaces on their outer circumferences. The double row inner raceway surfaces oppose the double row outer raceway surfaces. Double row rolling elements are contained between the inner and outer raceway surfaces of the inner and outer members. A magnetic encoder is mounted on the outer circumference of the inner ring. Annular openings, formed by the inner and outer members, are sealed by a seal mounted on the outer-side end of the outer member and by a protecting cover mounted on the inner-side end of the outer member. The protecting cover is formed of non-magnetic material with a substantially dish-shaped configuration. A cylindrical fitting portion is adapted to be press-fit onto the inner circumference of the inner-side end of the outer member. A disc-shaped shielding portion extends radially inward from the fitting portion, via a radially tapered portion. The disc shaped portion is adapted to be closely arranged or in contact with a sensor. A bottom portion extends from the shielding portion, via a stepped portion. The bottom portion covers the inner-side end of the inner member. A flat relief portion is formed between the radially tapered portion and the shielding portion. The flat relief portion is parallel with the shielding portion. The flat relief portion is set slightly back from the shielding portion toward the radially tapered portion. An elastic member is integrally adhered to the outer circumference of the radially tapered portion, via vulcanizing adhesion. The elastic member is adapted to elastically contact with the inner circumference of the inner-side end of the outer member.

In the wheel bearing apparatus of a so-called inner ring rotation type, the protecting cover is formed of non-magnetic material. It has a substantially dish-shaped configuration and includes a cylindrical fitting portion, a disc-shaped shielding portion, a radially tapered portion, a bottom portion, a flat relief portion and an elastic member. The cylindrical portion is adapted to be press-fit onto the inner circumference of the inner-side end of the outer member. The disc-shaped shielding portion extends radially inward from the fitting portion, via a radially tapered portion. The disc-shaped shield portion is adapted to be closely arranged or in contact with a sensor. The bottom portion extends from the shielding portion, via a stepped portion. The bottom portion covers the inner-side end of the inner member. The flat relief portion is formed between the radially tapered portion and the shielding portion. The flat relief portion is parallel with the shielding portion. The flat relief portion is set slightly back from the shielding portion toward the radially tapered portion. The elastic member is integrally adhered to the outer circumference of the radially tapered portion, via vulcanizing adhesion. The elastic member is adapted to elastically contact the inner circumference of the inner-side end of the outer member. Thus, it is possible to provide a wheel bearing apparatus that can improve the sealability of the fit portion between the protecting cover and the outer member. Also, it improves the detecting accuracy and reliability of the rotational speed of a wheel while surely preventing the bulged-out rubber of the elastic member from interfering with the sensor and giving adverse influences to the detecting accuracy. This is due to the fact that the bulged-out rubber of the elastic member does not reach the shielding portion of the protecting cover even if the rubber of the elastic member is bulged out from the radially tapered portion of the protecting cover to the side surface of the relief portion.

The elastic member comprises an annular portion formed with an outer diameter smaller than that of the fitting portion of the protecting cover. A projected portion is formed with an outer diameter larger than that of the fitting portion of the protecting cover. The projected portion is adapted to be press-fit into the inner circumference of the inner-side end of the outer member via a predetermined interference. This makes it possible to further improve the sealability of the fitting surfaces between the outer member and the protecting cover.

The elastic member extends over a region from the outer circumference of the radially tapered portion to the inner-side surface of the relief portion. The relief portion makes it possible to arrange the die-pressing portion during the rubber vulcanizing process to be co-planar with the relief portion. Thus, it performs easy and convenient vulcanization while preventing bulging out of the rubber. Also, it prevents the generation of distortion of the protecting cover.

The elastic member is securely adhered to the protecting cover over a region from the outer circumference of the radially tapered portion to a position slightly projected from the inner-side surface of the relief portion toward the shielding portion. This makes it possible to increase the adhesive strength of the elastic member. Thus, this prevents separation of rubber from the protecting cover and improves the reliability of the wheel bearing apparatus.

The protecting cover is press-formed from austenitic stainless steel sheet. A bent portion is between the relief portion and the shielding portion of the protecting cover. The bent portion is set spaced apart from the sensing area of the sensor by a predetermined separated amount (distance) so that it does not enter into the sensing area. This makes it possible to prevent adverse magnetic influence on the encoder. Thus, a desirable detecting accuracy is obtained even if the bent portion would be excessively deformed during the pressing process and transformed into martensite.

The diameter of the bent portion between the relief portion and the shielding portion of the protecting cover is set larger than the outer diameter of the encoder. This makes it possible to surely prevent the encoder from being influenced by magnetization of the bent portion due to its martensitic transformation. Accordingly, a desirable detecting accuracy is obtained.

The protecting cover is press-formed so that the relief portion has a sheet thickness thinner than that of the other portions of the protecting cover. This makes it possible for the relief portion to absorb a deformation of the protecting cover caused during press-fitting of the protecting cover into the outer member. Thus, this suppresses the deformation of the protecting cover that would give a substantial influence to the detecting accuracy.

The sheet thickness of the relief portion of the protecting cover is set 0.4 mm. The ratio of the sheet thickness of the relief portion and that of other portions of the protecting cover is set 80% (t1/t0≧0.80) or more. This assures the rigidity of the protecting cover.

The bottom portion of the protecting cover has multiple bent portions. Thus, it has an outline configuration along the inner-side end of the inner member. This increases the rigidity of the protecting cover. Thus, this prevents its deformation that would be caused by bouncing pebbles.

The material of the elastic member is selected from a group of HNBR, EPDM, ACM, FKM and silicone rubber. This enables the elastic member to have excellent heat resistance and chemical resistance. Thus, this assures the durability of the elastic member for a long term.

The wheel bearing apparatus comprises an outer member integrally formed with double row outer raceway surfaces on its inner circumference. An inner member includes a wheel hub and at least one inner ring. The wheel hub is integrally formed on its one end with a wheel mounting flange. A cylindrical portion axially extends from the wheel mounting flange. The inner ring is press-fit onto the cylindrical portion of the wheel hub. The wheel hub and the inner ring are formed with double row inner raceway surfaces on their outer circumferences. The double row inner raceway surfaces oppose the double row outer raceway surfaces. Double row rolling elements are contained between the inner and outer raceway surfaces of the inner and outer members. A magnetic encoder is mounted on the outer circumference of the inner ring. Annular openings, formed by the inner and outer members, are sealed by a seal mounted on the outer-side end of the outer member and by a protecting cover mounted on the inner-side end of the outer member. It has a substantially dish-shaped configuration and includes a cylindrical fitting portion, a disc-shaped shielding portion, a radially tapered portion, a bottom portion, a flat relief portion and an elastic member. The cylindrical portion is adapted to be press-fit onto the inner circumference of the inner-side end of the outer member. The disc-shaped shielding portion extends radially inward from the fitting portion, via a radially tapered portion. The disc-shaped shield portion is adapted to be closely arranged or in contact with a sensor. The bottom portion extends from the shielding portion, via a stepped portion. The bottom portion covers the inner-side end of the inner member. The flat relief portion is formed between the radially tapered portion and the shielding portion. The flat relief portion is parallel with the shielding portion. The flat relief portion is set slightly back from the shielding portion toward the radially tapered portion. The elastic member is integrally adhered to the outer circumference of the radially tapered portion, via vulcanizing adhesion. The elastic member is adapted to elastically contact the inner circumference of the inner-side end of the outer member. The bulged-out rubber of the elastic member does not reach the shielding portion of the protecting cover even if the rubber of the elastic member would be bulged out from the radially tapered portion of the protecting cover to the side surface of the relief portion. Thus, the wheel bearing apparatus can improve the sealability of the fit portion between the protecting cover and the outer member. Also, it improves the detecting accuracy and reliability of the rotational speed of a wheel while surely preventing the bulged-out rubber of the elastic member from interfering with the sensor and from giving adverse influences to the detecting accuracy.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 7:
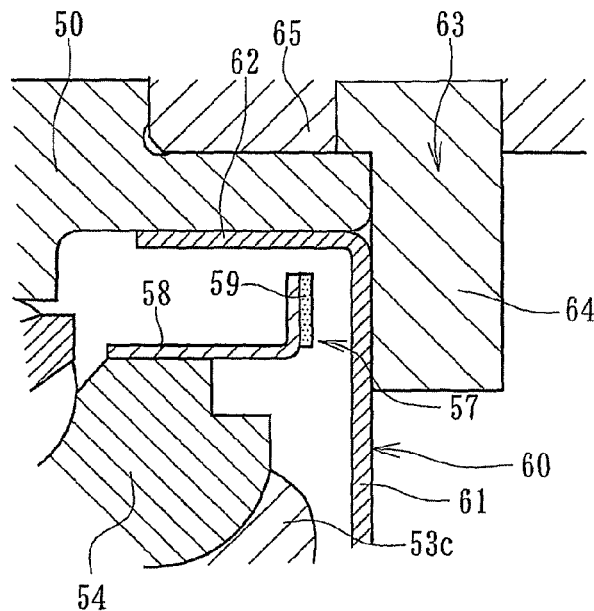
FIG. 7(a) is a partially enlarged partial view of FIG. 6.
Figure 7:
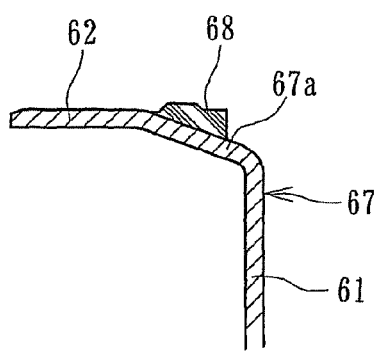
Figure 7:
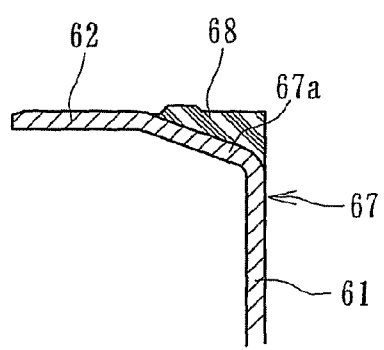
Figure 7:
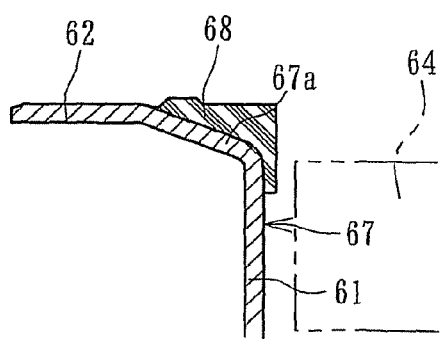

FIGS. 7(b)-(d) are partially enlarged partial views of modifications of FIG. 7(a).

DETAILED DESCRIPTION

Preferable mode for carrying out the present disclosure is a wheel bearing apparatus including an outer member integrally formed with a body mounting flange on its outer circumference. The body mounting flange is mounted on a knuckle of a vehicle. The outer member inner circumference has double row outer raceway surfaces. An inner member includes a wheel hub and an inner ring. The wheel hub is integrally formed with a wheel mounting flange on its one end. The wheel hub outer circumference has one inner raceway surface opposing one of the outer raceway surfaces. A cylindrical portion axially extends from the inner raceway surface. The inner ring is formed on its outer circumference with the other inner raceway surface opposing the other of the outer raceway surfaces. The inner ring is axially secured on the wheel hub under a bearing pre-pressured condition by a caulked portion. The caulked portion is formed by plastically deforming the end of the cylindrical portion of the wheel hub. A magnetic encoder is mounted on the inner ring. A seal is mounted on an outer-side end of the outer member. A protecting cover is mounted on the inner-side end of the outer member to seal an annular opening formed by the outer and inner members. The protecting cover is press-formed from non-magnetic material. It has a substantially dish-shaped configuration with a cylindrical fitting portion adapted to be press-fit onto the inner circumference of the inner-side end of the outer member. A disc-shaped shielding portion extends radially inward from the fitting portion, via a radially tapered portion extending from the fitting portion. The shielding portion is adapted to be closely arranged or in contact with a sensor. A bottom portion extends from the shielding portion via a stepped portion. The bottom portion covers the inner-side. A flat relief portion is formed between the radially tapered portion and the shielding portion. The flat relief portion is parallel with the shielding portion. The flat relief portion is set slightly back from the shielding portion toward the radially tapered portion. The elastic member includes an annular portion and a projected portion. The annular portion is formed with an outer diameter smaller than that of the fitting portion of the protecting cover. The projected portion is formed with an outer diameter larger than that of the fitting portion of the protecting cover. The projected portion is adapted to be press-fit into the inner circumference of the inner-side end of the outer member.

Preferable embodiments of the present disclosure will be described with reference to accompanied drawings.

Figure 1:
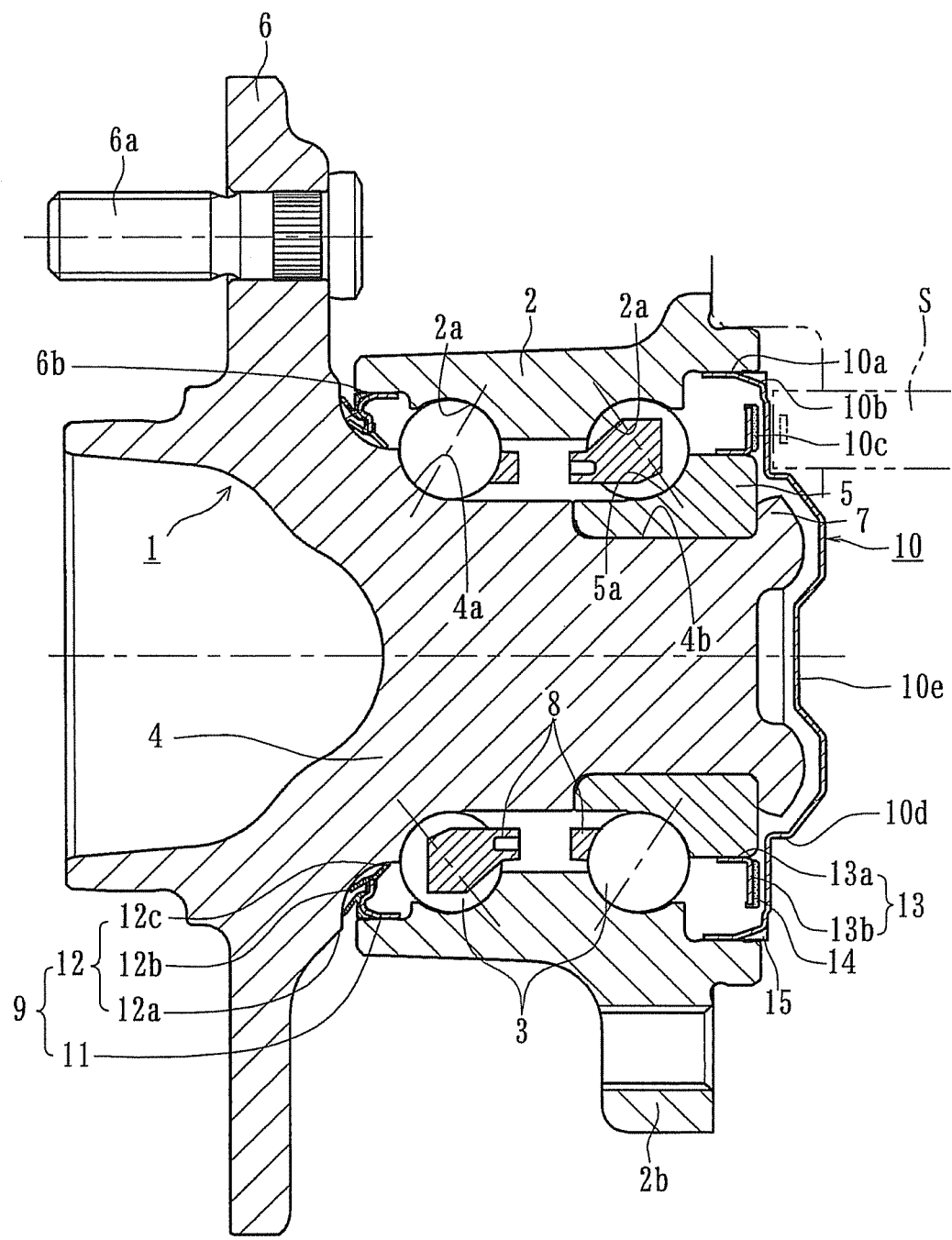
FIG. 1 is a longitudinal-section view of a first embodiment of a wheel bearing apparatus.
Figure 2:
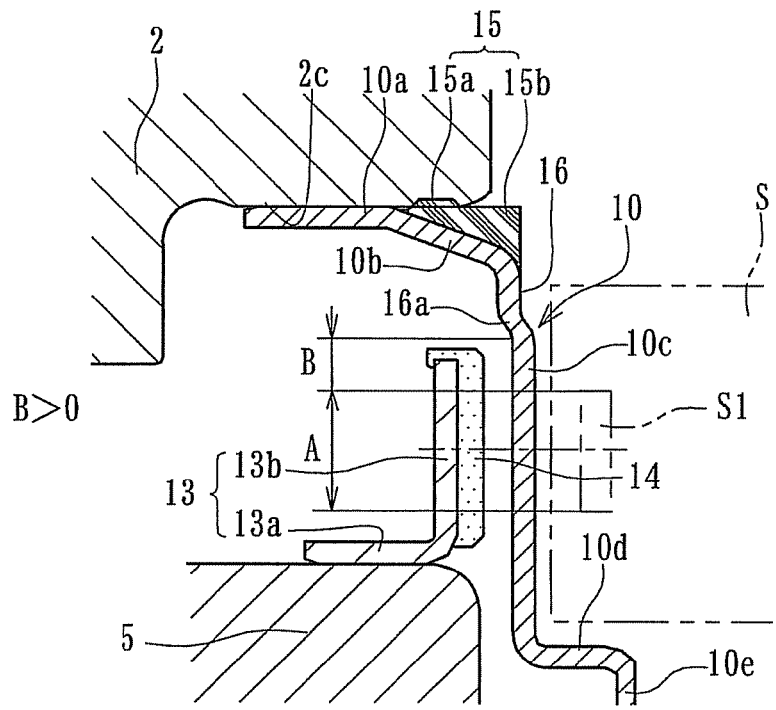
FIG. 2 is a partially enlarged partial view of FIG. 1.
Figure 3:
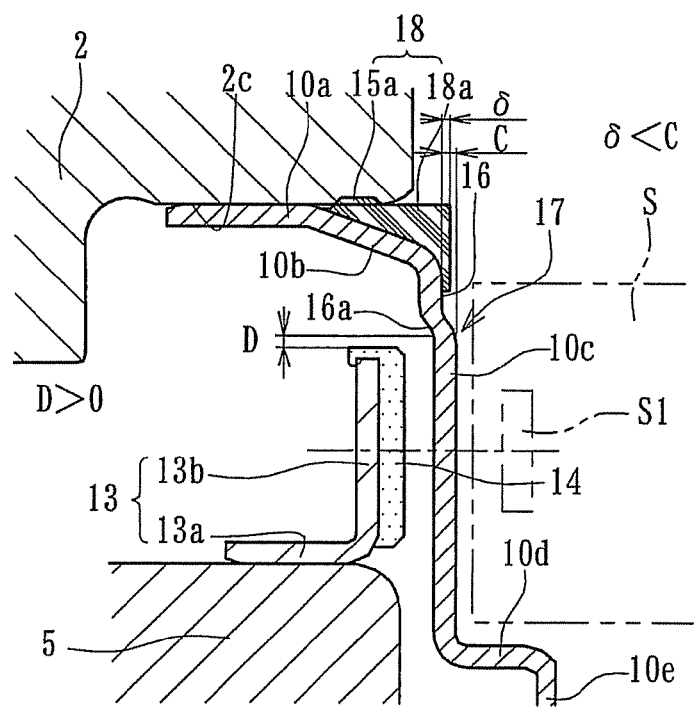
FIG. 3 is a partially enlarged partial view of a modification of the first embodiment of FIG. 2.

FIG. 1 is a longitudinal-section view of a first embodiment of a wheel bearing apparatus. FIG. 2 is a partially enlarged partial view of FIG. 1. FIG. 3 is a partially enlarged partial view of a modification of FIG. 2. In the description below, an outer side of a bearing apparatus, when it is mounted on a vehicle, is referred to as the "outer-side" (the left-side in drawings). An inner side of a bearing apparatus, when it is mounted on a vehicle, is referred to as the "inner-side" (the right-side in drawings).

The wheel bearing apparatus of the present disclosure is a so-called "third generation" type. It includes an inner member 1, an outer member 2, and double row rolling elements (balls) 3, 3 contained between the inner and outer members 1, 2. The inner member 1 includes a wheel hub 4 and an inner ring 5 press-fit onto the wheel hub 4, via a predetermined interference.

The outer member 2 is made of medium/high carbon steel such as S53C including carbon of 0.40-0.80% by weight. It is integrally formed with a body mounting flange on its outer circumference. The body mounting flange 2b is adapted to be mounted on a knuckle (not shown). The outer member inner circumference has double row outer raceway surfaces 2a, 2a. These double row outer raceway surfaces 2a, 2a are hardened by high frequency induction quenching to have a surface hardness of 58-64 HRC.

The wheel hub 4 is integrally formed with a wheel mounting flange 6 on its outer side end. The wheel mounting flange 6 mounts a wheel (not shown). Hub bolts 6a are arranged on the wheel mounting flange 6 at circumferentially equidistant positions. In addition, the wheel hub 4 is formed, on its outer circumference, with one inner raceway surface 4a that corresponds to one (outer-side) of the outer raceway surfaces 2a. A cylindrical portion 4b axially extends from the inner raceway surface 4a.

The inner ring 5 is formed, on its outer circumference, with the other inner raceway surface 5a that corresponds to the other (inner-side) of the double row outer raceway surfaces 2a, 2a. The inner ring 5 is press-fit onto the cylindrical portion 4b of the wheel hub 4 via a predetermined interference. The inner ring 5 is axially secured on the cylindrical portion 4b of the wheel hub 4 under a predetermined bearing pre-pressure, by a caulked portion 7. The caulked portion 7 is formed by plastically deforming the end of the cylindrical portion 4b radially outward.

The double row rolling elements 3 and 3 are contained between the outer raceway surfaces 2a, 2a of the outer member 2 and the oppositely arranged inner raceway surfaces 4a, 5a. The rolling elements 3, 3 are held by cages 8, 8. A seal 9 is mounted in an annular opening formed between the outer member 2 and the inner member 1. A protecting cover 10 is mounted in an inner side opening to prevent leakage of grease contained within the bearing apparatus as well as entry of rain water or dust into the bearing.

Although it is shown as a double row angular contact ball bearing using balls as rolling elements 3, the present disclosure is not limited to such a bearing. It may be applied to a double row tapered roller bearing using tapered rollers as the rolling elements 3. In addition, although it is shown as a third generation type bearing where the inner raceway surface 4a is directly formed on the outer circumference of the wheel hub 4, the present disclosure can be applied to a first or second generation type bearing where a pair of inner rings are press-fit onto a cylindrical portion 4b of the wheel hub 4.

The wheel hub 4 is made of medium/high carbon steel such as S53C including carbon of 0.40~0.80% by weight. It is hardened by high frequency induction hardening to have a surface hardness of 58~64 HRC in a region including the inner raceway surface 4a, an inner-side base portion 6b of the wheel mounting flange 6 and the cylindrical portion 4b of the wheel hub 4. This makes it possible not only to improve the anti-abrasion characteristics of the base portion 6b forming a seal land portion of a seal 9, but to apply a sufficient mechanical strength of the wheel mounting flange 6 against a rotary bending load. Thus, this improves the durability of the wheel hub 4. The caulked portion 7 is not quenched and remains as is with a surface hardness after forging. This makes the caulking process easy and possibly prevents the generation of micro-cracks. The inner ring 5 and balls 3 are made of high carbon chrome steel such as SUJ2. They are hardened to their core by dip quenching to have a surface hardness of 58~64 HRC.

The seal 9 is formed as an integrated seal. It has a metal core 11 press-fit into the outer-side end of the outer member 2, via a predetermined interference. A sealing member 12 is adhered to the metal core 11. The metal core 11 is press-formed from austenitic stainless steel sheet (JIS SUS 304 etc.) or cold rolled steel sheet (JIS SPCC etc.). It has a substantially "L"-shaped cross-sectional configuration.

The sealing member 12 is formed of synthetic rubber such as NBR (acrylonitrile-butadiene rubber). It is integrally adhered to the metal core 11, via vulcanizing adhesion. The sealing member 12 includes a side lip 12a inclined radially outward and in slidable contact with to the inner-side surface of the wheel mounting flange 6, via a predetermined axial interference. Another side lip 12b slidably contacts the base portion 6b. The side lip 12b has a circular arc cross-sectional configuration via a predetermined axial interference. A grease lip 12c is inclined toward the inner-side of bearing.

A support ring 13, having a substantially "L"-shaped cross-section, is press-fit onto the inner ring 5. The support ring 13 has a cylindrical portion 13a adapted to be press-fit onto the outer circumference of the inner ring 5. A standing portion 13b extends radially outward from the cylindrical portion 13a. A magnetic encoder 14 is integrally adhered to one side surface of the standing portion 13b, via vulcanizing adhesion. The magnetic encoder 14 is formed of a rubber magnet of synthetic rubber mingled with magnetic powder, such as ferrite, and has magnetic N and S poles alternately arranged along its circumference.

The support ring 13 is press-formed from ferromagnetic steel plate e.g. ferritic stainless steel sheet (JIS SUS 430 etc.) or preserved cold rolled sheet (JIS SPCC etc.). This makes it possible to prevent the generation of rust on the support ring 13. Also, this increases the output of the magnetic encoder 14 and accordingly keeps stable detecting accuracy.

The protecting cover 10 mounted on the inner-side end of the outer member 2 is press-formed from non-magnetic austenitic stainless steel sheet (JIS SUS 304 etc.) or preserved cold rolled steel sheet (JIS SPCC etc.) to have a substantially dish-shaped configuration. The protecting cover 10 includes a cylindrical fitting portion 10a. The cylindrical fitting portion 10a is adapted to be press-fit onto the inner circumference of the inner-side end of the outer member 2. A disc-shaped shielding portion 10c extends radially inward from the fitting portion 10a, via a radially tapered portion 10b. A bottom portion 10e extends from the shielding portion 10c, via a cylindrical portion or stepped portion 10d. The bottom portion 10e covers the inner-side end of the inner member 1. The bottom portion 10e of the protecting cover 10 has multiple bent portions. This provides an outline configuration along the inner-side end of the inner member 1. This makes it possible to increase the rigidity of the protecting cover 10. Thus, this prevents deformation that would be caused by bouncing pebbles. In this embodiment, although it is shown that the protecting cover 10 is formed from non-magnetic steel sheet, the present disclosure is not limited to this embodiment. Other non-magnetic material such as plastics, aluminum alloy, or titanium alloy etc. may be used.

As shown in the enlarged view of FIG. 2, a detecting portion S1 of a sensor S is closely positioned or in contact with the shielding portion 10c of the protecting cover 10. Thus, the detecting portion S1 opposes the protecting cover 10 via a predetermined air gap (axial gap). Since the protecting cover 10 is formed of non-magnetic material, no influence is applied to the path of magnetic flux. Thus, it is possible to improve the corrosion resistance and durability of the wheel bearing apparatus for a long term.

According to this embodiment, a relief portion 16 is positioned between the radially tapered portion 10b and the shielding portion 10c of the protecting cover 10. The relief portion 16 is flat and is parallel with the shielding portion 10c. Also, it is set slightly back from the shielding portion 10c toward the radially tapered portion 10b. An elastic member 15 extends over a region from the outer circumference of the radially tapered portion 10b to the inner-side surface of the relief portion 16. The relief portion 16 makes it possible to arrange the die-pressing portion (not shown), during the rubber vulcanizing process, co-planar to the relief portion 16. Thus, it is possible to perform easy and convenient vulcanization while preventing bulging out of the rubber as well as to prevent the generation of distortion of the protecting cover 10.

The elastic member 15 has a projected portion 15a and an annular portion 15b. The elastic member 15 is formed from synthetic rubber such as NBR etc. The elastic member 15 is integrally adhered to the protecting cover 10 via vulcanizing adhesion. The annular portion 15b has an outer diameter smaller than that of the fitting portion 10a of the protecting cover 10. The projected portion 15a has an outer diameter larger than that of the fitting portion 10a of the protecting cover 10. The projected portion 15a is adapted to be press-fit into the inner circumference 2c of the inner-side end of the outer member 2, via a predetermined interference. This further improves the sealability of the fitting surfaces between the outer member 2 and the protecting cover 10. In addition, it provides a wheel bearing apparatus that can improve the detecting accuracy and reliability of the rotational speed of a wheel while surely preventing the bulged-out rubber of the elastic member 15 from interfering with the sensor S and giving adverse influences to the detecting accuracy. This is because the bulged-out rubber of the elastic member 15 does not reach the shielding portion 10c of the protecting cover 10 even if the rubber of the elastic member 15 would bulged out from the radially tapered portion 10b of the protecting cover 10 to the side surface of the relief portion 16.

Materials for forming the elastic member 15 are exemplary shown such as HNBR (hydride acrylonitrile-butadiene rubber), EPDM (ethylene-propylene rubber) etc. excellent in the heat resistance and chemical resistance, ACM (poly-acryl rubber), FKM (fluoroelastomer) or silicone rubber.

Furthermore, according to the present disclosure, a bent portion 16a is provided between the relief portion 16 and the shielding portion 10c of the protecting cover 10. The bent portion 16a is set spaced apart from a sensing area A of the detecting portion S1 by a predetermined separated amount (distance) B (B>0) so that it does not enter into the sensing area A. This makes it possible to prevent adverse magnetic influence onto the encoder 14 due to magnetization of the bent portion 16a by martensitic transformation which would be caused during the pressing process.

FIG. 3 shows a modification of the protecting cover 10 of the first embodiment shown in FIGS. 1 and 2. The protecting cover 17 of this modification is substantially same as the protecting cover 10 except for partial difference of structure of the elastic member. Thus, the same reference numerals used to identify parts or portions of this modification as those used in the first embodiment and detailed description of them will be omitted.

In this modification, the elastic member 18 is formed from synthetic rubber such as nitrile rubber. It has the projected portion 15a and an annular portion 18a. The elastic member 18 is adhered to the protecting cover 17 over a region from the outer circumference of the radially tapered portion 10b to a position slightly projected from the inner-side surface of the relief portion 16 toward the shielding portion 10c. The projected amount (distance) δ is set smaller than a step height C between the relief portion 16 and the shielding portion 10c (δ<C). This makes it possible to increase the adhesive strength of the elastic member 18. Thus, this prevents separation of rubber 18 from the protecting cover 17 and improves the reliability of the wheel bearing apparatus.

Similarly to the first embodiment, the bent portion 16a, between the relief portion 16 and the shielding portion 10c, is positioned outside the diameter of the magnetic encoder 14. That is, separated amount (distance) D between the bent portion 16a and the magnetic encoder 14 is larger than 0 (D>0). This makes it possible to surely prevent the encoder from being influenced by magnetization of the bent portion 16a due to its martensitic transformation. Also, a desirable detecting accuracy is obtained.

Figure 4:
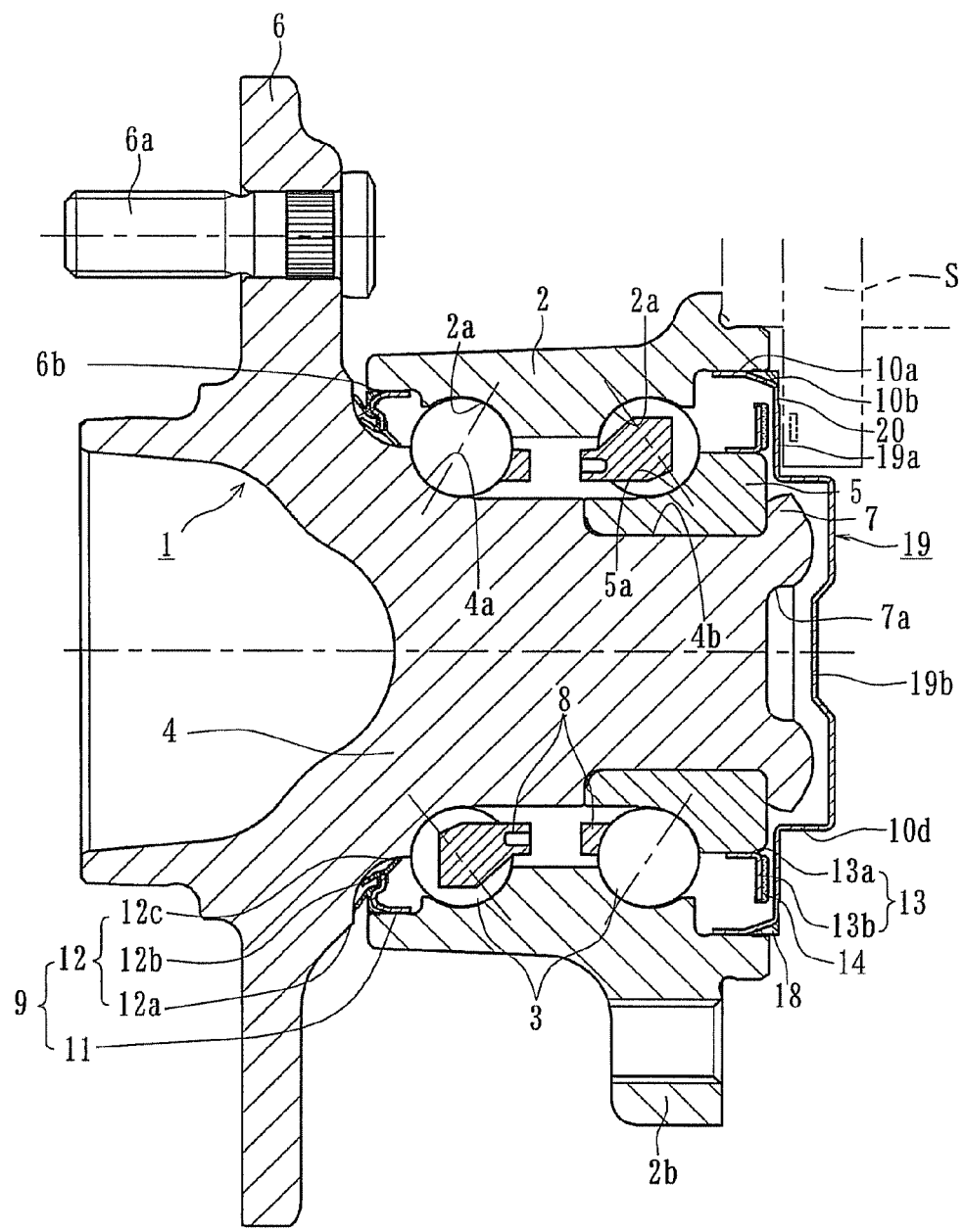
FIG. 4 is a longitudinal-section view of a second embodiment of a wheel bearing apparatus.
Figure 5:
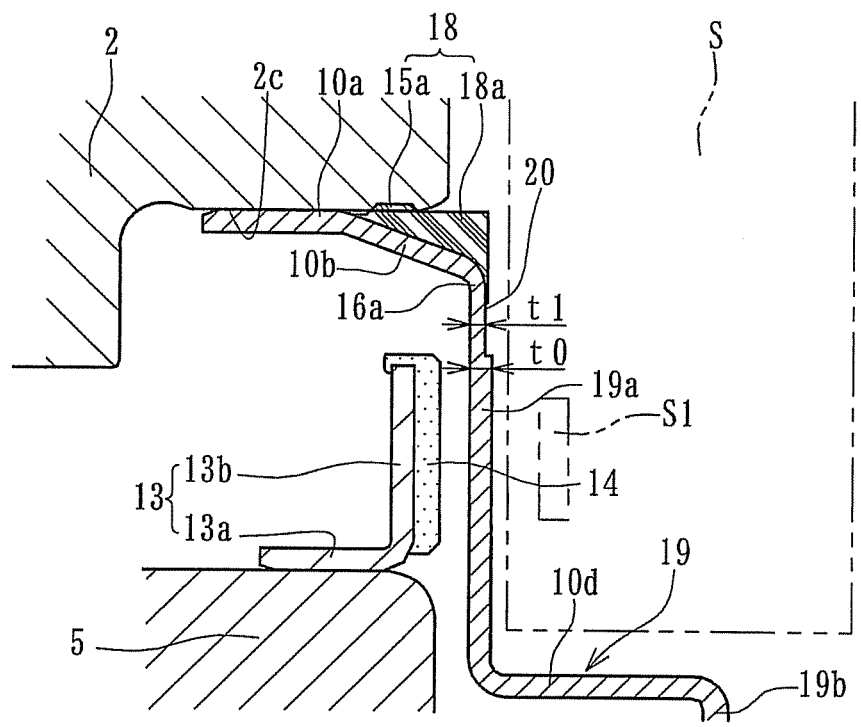
FIG. 5 is a partially enlarged partial view of FIG. 4.
Figure 6:
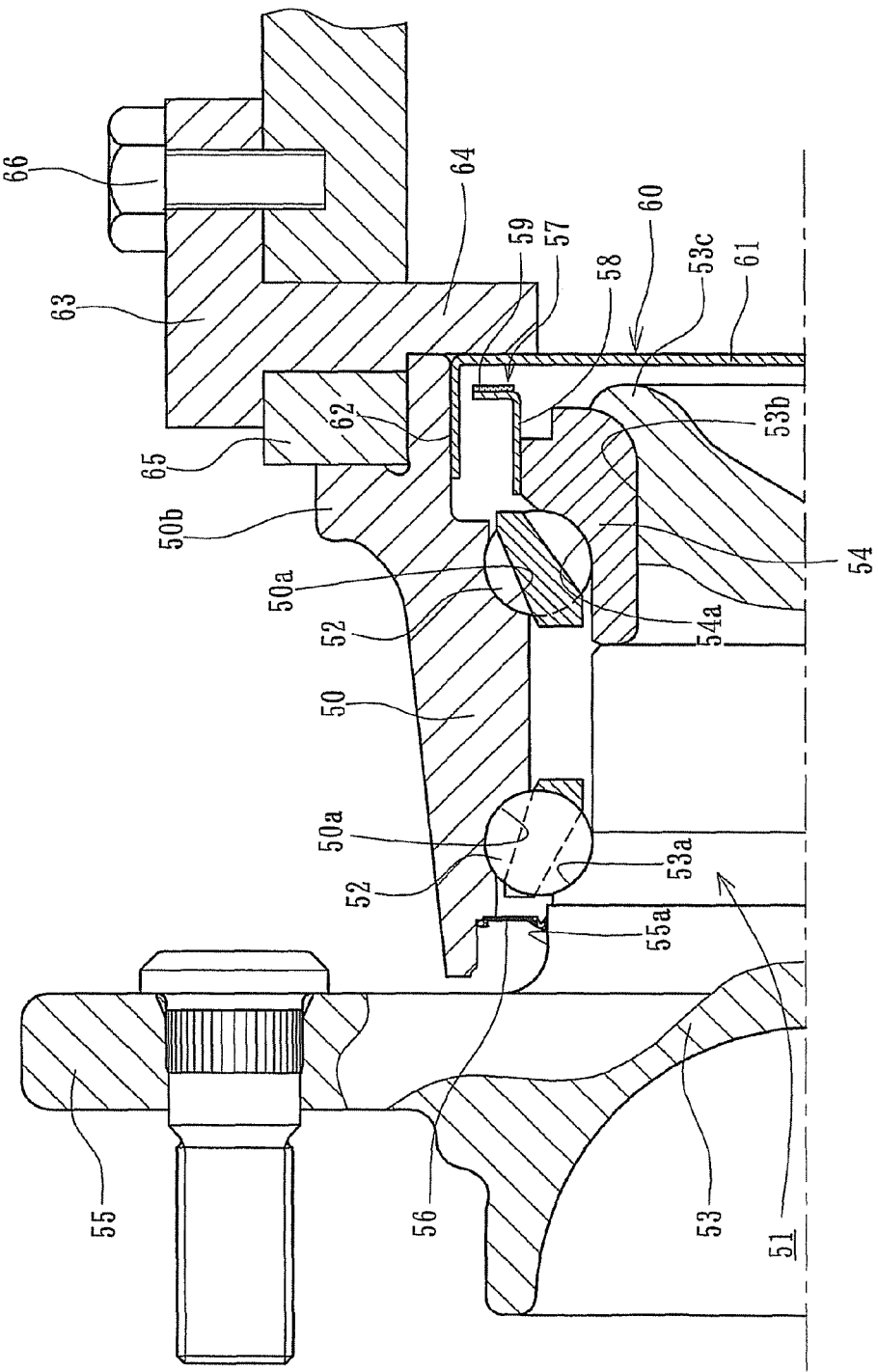
FIG. 6 is a longitudinal-section view of a prior art wheel bearing apparatus.

FIG. 4 is a longitudinal-section view of a second embodiment of a wheel bearing apparatus. FIG. 5 is a partially enlarged partial view of FIG. 4. The same reference numerals are used to identify parts or portions of this second embodiment as those used in the first embodiment. Thus, their detailed description will be omitted.

A protecting cover 19 is mounted on the inner-side end of the outer member 2. It is press-formed from non-magnetic austenitic stainless steel sheet (JIS SUS 304 etc.) or preserved cold rolled steel sheet (JIS SPCC etc.). It has a substantially dish-shaped configuration. The protecting cover 19 includes the cylindrical fitting portion 10a that is adapted to be press-fit onto the inner circumference of the inner-side end of the outer member 2. A disc-shaped shielding portion 19a extends radially inward from the fitting portion 10a, via the radially tapered portion 10b. A bottom portion 19b extends from the shielding portion 19a via a cylindrical or stepped portion 10d. The bottom portion 19b covers the inner-side end of the inner member 1. The bottom portion 19b of the protecting cover 19 has multiple bent portions. Thus, it has a portion recessed toward a recessed portion 7a of the caulked portion 7. Similarly to the first embodiment, this makes it possible to increase the rigidity of the protecting cover 19. Thus, this prevents its deformation that would be caused by bouncing pebbles.

As shown in the enlarged view of FIG. 5, a flat relief portion 20 is formed between the radially tapered portion 10b and the shielding portion 19a of the protecting cover 19. The flat relief portion 20 is parallel with the shielding portion 19a and is slightly recessed from the shielding portion 19a toward the radially tapered portion 10b. In particular, the protecting cover 19 is press-formed so that the relief portion 20 has a sheet thickness t1. The thickness t1 is thinner than the sheet thickness t0 of other portions. Thus, the relief portion 20 is thinner than the fitting portion 10a, the radially tapered portion 10b, shielding portion 10c, the cylindrical portion stepped portion 10d and the bottom portion 19b. The elastic member 18 is securely adhered to the protecting cover 19 over a region from the outer circumference of the radially tapered portion 10b to a position slightly projected from the inner-side surface of the relief portion 20 toward the shielding portion 10c.

The sheet thickness t1 of the relief portion 20 of the protecting cover 19 is set 0.4 mm or more. The ratio t1/t0 of the sheet thickness t1 of the relief portion 20 and the sheet thickness t0 of other portions of the protecting cover 19 is set at 80% or more (t1/t0≥0.80). This assures sufficient rigidity and absorbs the deformation of the protecting cover 19 caused during press-fitting of it into the outer member 2. Thus, this suppresses the deformation of the shielding portion 19a that would adversely influence the detecting accuracy.

The wheel bearing apparatus of the present disclosure can be applied to wheel bearing apparatus of first through third generation types of inner ring rotation type used for a driven wheel.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:
    an outer member integrally formed with double row outer raceway surfaces on its inner circumference;
    an inner member including a wheel hub and at least one inner ring, the wheel hub is integrally formed with a wheel mounting flange on its one end, a cylindrical portion axially extends from the wheel mounting flange, the inner ring is press-fit onto the cylindrical portion of the wheel hub, the wheel hub and the inner ring are formed with double row inner raceway surfaces on their outer circumferences, the double row inner raceway surfaces oppose the double row outer raceway surfaces;
    double row rolling elements are contained between the inner and outer raceway surfaces of the inner and outer members;
    a magnetic encoder is mounted on the outer circumference of the inner ring; and
    annular openings are formed by the inner and outer members, a seal is mounted on the outer-side end of the outer member and a protecting cover is mounted on the inner-side end of the outer member;
    the protecting cover is formed from non-magnetic material, the protecting cover has a substantially dish-shaped configuration and comprises a cylindrical fitting portion, a disc-shaped shielding portion and a bottom portion, the cylindrical fitting portion is adapted to be press-fit onto the inner circumference of the inner-side end of the outer member, the disc-shaped shielding portion extends radially inward from the fitting portion via a radially tapered portion, the disc-shaped shielding portion is adapted to be closely arranged or in contact with a sensor, the bottom portion extends from the shielding portion, via a stepped portion, the bottom portion covers the inner-side end of the inner member;
    a flat relief portion is formed between the radially tapered portion and the shielding portion, the flat relief portion is parallel to the shielding portion and set slightly back from the shielding portion toward the radially tapered portion; and
    an elastic member is integrally adhered to the outer circumference of the radially tapered portion via vulcanizing adhesion, the elastic member is adapted to elastically contact the inner circumference of the inner-side end of the outer member.

2. The wheel bearing apparatus of claim 1, wherein the elastic member further comprises an annular portion and a projected portion, the annular portion is formed with an outer diameter smaller than that of the fitting portion of the protecting cover, the projected portion is formed with an outer diameter larger than that of the fitting portion of the protecting cover, the projected portion is adapted to be press-fit into the inner circumference of the inner-side end of the outer member, via a predetermined interference.

3. The wheel bearing apparatus of claim 1, wherein the elastic member extends over a region from the outer circumference of the radially tapered portion to the inner-side surface of the relief portion.

4. The wheel bearing apparatus of claim 1, wherein the elastic member is securely adhered to the protecting cover over a region from the outer circumference of the radially tapered portion to a position slightly projected from the inner-side surface of the relief portion toward the shielding portion.

5. The wheel bearing apparatus of claim 1, wherein the protecting cover is press-formed from austenitic stainless steel sheet and a bent portion, between the relief portion and the shielding portion, of the protecting cover is set spaced apart from a sensing area of the sensor by a predetermined separated distance so that it does not enter into the sensing area.

6. The wheel bearing apparatus of claim 5, wherein the diameter of the bent portion, between the relief portion and the shielding portion of the protecting cover, is set larger than the outer diameter of the encoder.

7. The wheel bearing apparatus of claim 5, wherein the protecting cover is press-formed so that the relief portion has a sheet thickness thinner than that of other portions of the protecting cover.

8. The wheel bearing apparatus of claim 7, wherein the sheet thickness of the relief portion of the protecting cover is set at 0.4 mm or more and the ratio (t1/t0) of the sheet thickness of the relief portion and that of other portions of the protecting cover is set at 80% or more (t1/t0≥0.80).

9. The wheel bearing apparatus claim 1, wherein the bottom portion of the protecting cover has multiple bent portions to have an outline configuration along the inner-side end of the inner member.

10. The wheel bearing apparatus of claim 1, wherein the material of the elastic member is selected from a group of HNBR, EPDM, ACM, FKM and silicone rubber.

* * * * *